(12) United States Patent
Wang et al.

(10) Patent No.: US 12,050,693 B2
(45) Date of Patent: Jul. 30, 2024

(54) SYSTEM AND METHOD FOR ATTRIBUTING USER BEHAVIOR FROM MULTIPLE TECHNICAL TELEMETRY SOURCES

(71) Applicant: vArmour Networks, Inc., Los Altos, CA (US)

(72) Inventors: Hsisheng Wang, Taipei (TW); Paul Bigbee, Palo Alto, CA (US); Marc Woolward, Bude (GB); Keith Stewart, San Francisco, CA (US); Meng Xu, Los Altos, CA (US)

(73) Assignee: vArmour Networks, Inc., Los Altos, CA (US)

( * ) Notice: Subject to any disclaimer, the term of this patent is extended or adjusted under 35 U.S.C. 154(b) by 109 days.

(21) Appl. No.: 17/162,761

(22) Filed: Jan. 29, 2021

(65) Prior Publication Data

US 2022/0245256 A1 Aug. 4, 2022

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| | | | |
|---|---|---|---|
| 6,253,321 B1 | 6/2001 | Nikander et al. | |
| 6,405,318 B1 * | 6/2002 | Rowland | G06F 21/552 726/22 |

(Continued)

FOREIGN PATENT DOCUMENTS

| | | |
|---|---|---|
| TW | 201642616 A | 12/2016 |
| TW | 201642617 A | 12/2016 |

(Continued)

OTHER PUBLICATIONS

"International Search Report" and "Written Opinion of the International Searching Authority," Patent Cooperation Treaty Application No. PCT/US2016/024116, May 3, 2016, 12 pages.

(Continued)

*Primary Examiner* — Chau Le
*Assistant Examiner* — Zhe Liu
(74) *Attorney, Agent, or Firm* — Carr & Ferrell LLP (57) ABSTRACT

Systems and methods for attributing user behavior from multiple technical telemetry sources are provided. An example method includes determining that the user has logged into the computing device, in response of the determination, collecting log data from a plurality of telemetry sources associated with the computing device, extracting, from the log data, activity data concerning activities of the computing device, analyzing the activity data to determine that the activity data are attributed to the user, generating, based on the activity data, behavior attributes of the user, associating the behavior attributes with a unique identifier of the computing device, and estimating security integrity of the computing device based on a comparison of the behavior attributes to reference behavior attributes. The reference behavior attributes include further behavior attributes determined using log data of at least one further computing device associated with the user.

19 Claims, 6 Drawing Sheets

(56) References Cited

U.S. PATENT DOCUMENTS

| | | |
|---|---|---|
| 6,484,261 B1 | 11/2002 | Wiegel |
| 6,578,076 B1 | 6/2003 | Putzolu |
| 6,765,864 B1 | 7/2004 | Natarajan et al. |
| 6,970,459 B1 | 11/2005 | Meier |
| 6,981,155 B1 | 12/2005 | Lyle et al. |
| 7,058,712 B1 | 6/2006 | Vasko et al. |
| 7,062,566 B2 | 6/2006 | Amara et al. |
| 7,096,260 B1 | 8/2006 | Zavalkovsky et al. |
| 7,373,524 B2 | 5/2008 | Motsinger et al. |
| 7,397,794 B1 | 7/2008 | Lacroute et al. |
| 7,467,408 B1 | 12/2008 | O'Toole, Jr. |
| 7,475,424 B2 | 1/2009 | Lingafelt et al. |
| 7,516,476 B1 | 4/2009 | Kraemer et al. |
| 7,519,062 B1 | 4/2009 | Kloth et al. |
| 7,627,671 B1 | 12/2009 | Palma |
| 7,694,181 B2 | 4/2010 | Noller et al. |
| 7,725,937 B1 | 5/2010 | Levy |
| 7,742,414 B1 | 6/2010 | Iannaccone et al. |
| 7,774,837 B2 | 8/2010 | McAlister |
| 7,849,495 B1 | 12/2010 | Huang et al. |
| 7,900,240 B2 | 3/2011 | Terzis et al. |
| 7,904,454 B2 | 3/2011 | Raab |
| 7,996,255 B1 | 8/2011 | Shenoy et al. |
| 8,051,460 B2 | 11/2011 | Lum et al. |
| 8,112,304 B2 | 2/2012 | Scates |
| 8,254,381 B2 | 8/2012 | Allen et al. |
| 8,259,571 B1 | 9/2012 | Raphel |
| 8,291,495 B1 | 10/2012 | Burns et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,429,647 B2 | 4/2013 | Zhou |
| 8,468,113 B2 | 6/2013 | Harrison et al. |
| 8,490,153 B2 | 7/2013 | Bassett et al. |
| 8,494,000 B1 | 7/2013 | Nadkarni et al. |
| 8,499,330 B1 | 7/2013 | Albisu et al. |
| 8,528,091 B2 | 9/2013 | Bowen et al. |
| 8,539,548 B1 | 9/2013 | Overby, Jr. et al. |
| 8,565,118 B2 | 10/2013 | Shukla et al. |
| 8,612,744 B2 | 12/2013 | Shieh |
| 8,661,434 B1 | 2/2014 | Liang et al. |
| 8,677,496 B2 | 3/2014 | Wool |
| 8,688,491 B1 | 4/2014 | Shenoy et al. |
| 8,726,343 B1 | 5/2014 | Borzycki et al. |
| 8,730,963 B1 | 5/2014 | Grosser, Jr. et al. |
| 8,793,776 B1 * | 7/2014 | Jackson ............... H04W 4/021 726/7 |
| 8,798,055 B1 | 8/2014 | An |
| 8,813,169 B2 | 8/2014 | Shieh |
| 8,813,236 B1 | 8/2014 | Saha et al. |
| 8,819,762 B2 | 8/2014 | Harrison et al. |
| 8,898,788 B1 | 11/2014 | Aziz et al. |
| 8,935,457 B2 | 1/2015 | Feng et al. |
| 8,938,782 B2 | 1/2015 | Sawhney et al. |
| 8,990,371 B2 | 3/2015 | Kalyanaraman et al. |
| 9,009,829 B2 | 4/2015 | Stolfo et al. |
| 9,015,299 B1 | 4/2015 | Shah |
| 9,021,546 B1 | 4/2015 | Banerjee |
| 9,027,077 B1 | 5/2015 | Bharali et al. |
| 9,036,639 B2 | 5/2015 | Zhang |
| 9,060,025 B2 | 6/2015 | Xu |
| 9,141,625 B1 | 9/2015 | Thornewell et al. |
| 9,191,327 B2 | 11/2015 | Shieh et al. |
| 9,258,275 B2 | 2/2016 | Sun et al. |
| 9,294,302 B2 | 3/2016 | Sun et al. |
| 9,294,442 B1 | 3/2016 | Lian et al. |
| 9,361,089 B2 | 6/2016 | Bradfield et al. |
| 9,380,027 B1 | 6/2016 | Lian et al. |
| 9,405,665 B1 | 8/2016 | Shashi et al. |
| 9,407,602 B2 | 8/2016 | Feghali et al. |
| 9,516,053 B1 * | 12/2016 | Muddu ............... H04L 63/1441 |
| 9,521,115 B1 | 12/2016 | Woolward |
| 9,609,083 B2 | 3/2017 | Shieh |
| 9,621,595 B2 | 4/2017 | Lian et al. |
| 9,680,852 B1 | 6/2017 | Wager et al. |
| 9,762,599 B2 | 9/2017 | Wager et al. |
| 9,794,289 B1 | 10/2017 | Banerjee et al. |
| 9,973,472 B2 | 5/2018 | Woolward et al. |
| 10,009,317 B2 | 6/2018 | Woolward |
| 10,009,381 B2 | 6/2018 | Lian et al. |
| 10,091,238 B2 | 10/2018 | Shieh et al. |
| 10,116,441 B1 | 10/2018 | Rubin et al. |
| 10,191,758 B2 | 1/2019 | Ross et al. |
| 10,193,929 B2 | 1/2019 | Shieh et al. |
| 10,264,025 B2 | 4/2019 | Woolward |
| 10,333,827 B2 | 6/2019 | Xu et al. |
| 10,333,986 B2 | 6/2019 | Lian et al. |
| 10,382,467 B2 | 8/2019 | Wager et al. |
| 10,528,897 B2 | 1/2020 | Labat et al. |
| 10,630,703 B1 | 4/2020 | Ghosh et al. |
| 10,652,238 B1 * | 5/2020 | Edwards ............... H04L 63/102 |
| 10,755,334 B2 | 8/2020 | Eades et al. |
| 10,862,748 B1 | 12/2020 | Deruijter |
| 11,194,815 B1 | 12/2021 | Kumar et al. |
| 11,290,493 B2 | 3/2022 | Woolward et al. |
| 11,290,494 B2 | 3/2022 | Li et al. |
| 11,310,284 B2 | 4/2022 | Woolward et al. |
| 11,457,031 B1 * | 9/2022 | Bisht ............... H04L 63/1425 |
| 2002/0031103 A1 | 3/2002 | Wiedeman et al. |
| 2002/0066034 A1 | 5/2002 | Schlossberg et al. |
| 2003/0055950 A1 | 3/2003 | Cranor et al. |
| 2003/0177389 A1 | 9/2003 | Albert et al. |
| 2003/0225707 A1 * | 12/2003 | Ehrman ............... H04L 9/40 705/64 |
| 2004/0062204 A1 | 4/2004 | Bearden et al. |
| 2004/0095897 A1 | 5/2004 | Vafaei |
| 2004/0172557 A1 | 9/2004 | Nakae et al. |
| 2005/0021943 A1 | 1/2005 | Ikudome et al. |
| 2005/0033989 A1 | 2/2005 | Poletto et al. |
| 2005/0114829 A1 | 5/2005 | Robin et al. |
| 2005/0154576 A1 | 7/2005 | Tarui |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0005228 A1 | 1/2006 | Matsuda |
| 2006/0037077 A1 | 2/2006 | Gadde et al. |
| 2006/0050696 A1 | 3/2006 | Shah et al. |
| 2007/0016945 A1 | 1/2007 | Bassett et al. |
| 2007/0019621 A1 | 1/2007 | Perry et al. |
| 2007/0022090 A1 | 1/2007 | Graham |
| 2007/0064617 A1 | 3/2007 | Reves |
| 2007/0079308 A1 | 4/2007 | Chiaramonte et al. |
| 2007/0130566 A1 | 6/2007 | Van Rietschote |
| 2007/0157286 A1 | 7/2007 | Singh et al. |
| 2007/0157315 A1 * | 7/2007 | Moran ............... H04L 63/1425 726/23 |
| 2007/0162400 A1 | 7/2007 | Brew et al. |
| 2007/0168971 A1 | 7/2007 | Royzen et al. |
| 2007/0192861 A1 | 8/2007 | Varghese et al. |
| 2007/0192863 A1 | 8/2007 | Kapoor et al. |
| 2007/0198656 A1 | 8/2007 | Mazzaferri et al. |
| 2007/0239987 A1 | 10/2007 | Hoole et al. |
| 2007/0271612 A1 | 11/2007 | Fang et al. |
| 2007/0277222 A1 | 11/2007 | Pouliot |
| 2008/0016339 A1 | 1/2008 | Shukla |
| 2008/0016550 A1 | 1/2008 | McAlister |
| 2008/0083011 A1 | 4/2008 | McAlister et al. |
| 2008/0155239 A1 | 6/2008 | Chowdhury et al. |
| 2008/0163207 A1 | 7/2008 | Reumann et al. |
| 2008/0195670 A1 | 8/2008 | Boydstun |
| 2008/0229382 A1 | 9/2008 | Vitalos |
| 2008/0239961 A1 | 10/2008 | Hilerio et al. |
| 2008/0301770 A1 | 12/2008 | Kinder |
| 2008/0307110 A1 | 12/2008 | Wainner et al. |
| 2009/0077621 A1 | 3/2009 | Lang et al. |
| 2009/0077666 A1 | 3/2009 | Chen et al. |
| 2009/0083445 A1 | 3/2009 | Ganga |
| 2009/0138316 A1 | 5/2009 | Weller et al. |
| 2009/0165078 A1 | 6/2009 | Samudrala et al. |
| 2009/0190585 A1 | 7/2009 | Allen et al. |

(56) References Cited

U.S. PATENT DOCUMENTS

| | | |
|---|---|---|
| 2009/0249470 A1 | 10/2009 | Litvin et al. |
| 2009/0260051 A1 | 10/2009 | Igakura |
| 2009/0268667 A1 | 10/2009 | Gandham et al. |
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0088738 A1 | 4/2010 | Birnbach |
| 2010/0095367 A1 | 4/2010 | Narayanaswamy |
| 2010/0191863 A1 | 7/2010 | Wing |
| 2010/0192223 A1 | 7/2010 | Ismael et al. |
| 2010/0192225 A1 | 7/2010 | Ma et al. |
| 2010/0199349 A1 | 8/2010 | Ellis |
| 2010/0208699 A1 | 8/2010 | Lee et al. |
| 2010/0228962 A1 | 9/2010 | Simon et al. |
| 2010/0235880 A1 | 9/2010 | Chen et al. |
| 2010/0274970 A1 | 10/2010 | Treuhaft et al. |
| 2010/0281539 A1 | 11/2010 | Burns et al. |
| 2010/0287544 A1 | 11/2010 | Bradfield et al. |
| 2010/0333165 A1 | 12/2010 | Basak et al. |
| 2011/0003580 A1 | 1/2011 | Belrose et al. |
| 2011/0022812 A1 | 1/2011 | van der Linden et al. |
| 2011/0069710 A1 | 3/2011 | Naven et al. |
| 2011/0072486 A1 | 3/2011 | Hadar et al. |
| 2011/0090915 A1 | 4/2011 | Droux et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2011/0314102 A1* | 12/2011 | Teramoto ............... G06F 16/951 |
| | | 709/205 |
| 2012/0017258 A1 | 1/2012 | Suzuki |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0216273 A1 | 8/2012 | Rolette et al. |
| 2012/0278903 A1 | 11/2012 | Pugh |
| 2012/0284792 A1 | 11/2012 | Liem |
| 2012/0297383 A1 | 11/2012 | Meisner et al. |
| 2012/0311144 A1 | 12/2012 | Akelbein et al. |
| 2012/0311575 A1 | 12/2012 | Song |
| 2012/0324567 A1 | 12/2012 | Couto et al. |
| 2013/0019277 A1 | 1/2013 | Chang et al. |
| 2013/0054536 A1 | 2/2013 | Sengupta |
| 2013/0055370 A1* | 2/2013 | Goldberg ............... G06F 21/31 |
| | | 726/7 |
| 2013/0081142 A1 | 3/2013 | McDougal et al. |
| 2013/0086399 A1 | 4/2013 | Tychon et al. |
| 2013/0097138 A1 | 4/2013 | Barkol et al. |
| 2013/0097692 A1 | 4/2013 | Cooper et al. |
| 2013/0111586 A1* | 5/2013 | Jackson ............... G06F 21/316 |
| | | 726/23 |
| 2013/0145465 A1 | 6/2013 | Wang et al. |
| 2013/0151680 A1 | 6/2013 | Salinas et al. |
| 2013/0166490 A1 | 6/2013 | Elkins et al. |
| 2013/0166720 A1 | 6/2013 | Takashima et al. |
| 2013/0198799 A1 | 8/2013 | Staggs et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0254885 A1* | 9/2013 | Devost ............... G06F 21/56 |
| | | 726/23 |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0283336 A1 | 10/2013 | Macy et al. |
| 2013/0291088 A1 | 10/2013 | Shieh et al. |
| 2013/0298181 A1 | 11/2013 | Smith et al. |
| 2013/0298184 A1 | 11/2013 | Ermagan et al. |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0033267 A1 | 1/2014 | Aciicmez |
| 2014/0096229 A1 | 4/2014 | Burns et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0310765 A1 | 10/2014 | Stuntebeck et al. |
| 2014/0337743 A1 | 11/2014 | Branton |
| 2014/0344435 A1 | 11/2014 | Mortimore, Jr. et al. |
| 2015/0047046 A1 | 2/2015 | Pavlyushchik |
| 2015/0058983 A1 | 2/2015 | Zeitlin et al. |
| 2015/0082417 A1 | 3/2015 | Bhagwat et al. |
| 2015/0124606 A1 | 5/2015 | Alvarez et al. |
| 2015/0163088 A1 | 6/2015 | Anschutz |
| 2015/0180894 A1 | 6/2015 | Sadovsky et al. |
| 2015/0180949 A1 | 6/2015 | Maes |
| 2015/0205957 A1* | 7/2015 | Turgeman ............... G06F 21/554 |
| | | 726/23 |
| 2015/0229641 A1 | 8/2015 | Sun et al. |
| 2015/0235229 A1 | 8/2015 | Pryor |
| 2015/0249676 A1 | 9/2015 | Koyanagi et al. |
| 2015/0269383 A1 | 9/2015 | Lang et al. |
| 2015/0295943 A1 | 10/2015 | Malachi |
| 2016/0028851 A1 | 1/2016 | Shieh |
| 2016/0162179 A1 | 6/2016 | Annett et al. |
| 2016/0173521 A1 | 6/2016 | Yampolskiy et al. |
| 2016/0191466 A1 | 6/2016 | Pernicha |
| 2016/0191545 A1 | 6/2016 | Nanda et al. |
| 2016/0203331 A1 | 7/2016 | Khan et al. |
| 2016/0234250 A1 | 8/2016 | Ashley et al. |
| 2016/0269442 A1 | 9/2016 | Shieh |
| 2016/0294774 A1 | 10/2016 | Woolward et al. |
| 2016/0294875 A1 | 10/2016 | Lian et al. |
| 2016/0323245 A1 | 11/2016 | Shieh et al. |
| 2016/0337390 A1 | 11/2016 | Sridhara et al. |
| 2016/0350105 A1 | 12/2016 | Kumar et al. |
| 2016/0350165 A1* | 12/2016 | LeMond ............... G06F 11/0787 |
| 2016/0357424 A1 | 12/2016 | Pang et al. |
| 2016/0357774 A1 | 12/2016 | Gauchi et al. |
| 2017/0005986 A1 | 1/2017 | Bansal et al. |
| 2017/0013003 A1* | 1/2017 | Samuni ............... G06F 11/00 |
| 2017/0063795 A1 | 3/2017 | Lian et al. |
| 2017/0085654 A1 | 3/2017 | Mikhailov et al. |
| 2017/0118218 A1 | 4/2017 | Koottayi |
| 2017/0134422 A1 | 5/2017 | Shieh et al. |
| 2017/0168864 A1 | 6/2017 | Ross et al. |
| 2017/0180421 A1 | 6/2017 | Shieh et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0223038 A1 | 8/2017 | Wager et al. |
| 2017/0251013 A1 | 8/2017 | Kirti |
| 2017/0279770 A1 | 9/2017 | Woolward |
| 2017/0302685 A1 | 10/2017 | Ladnai et al. |
| 2017/0339188 A1 | 11/2017 | Jain et al. |
| 2017/0374032 A1 | 12/2017 | Woolward et al. |
| 2017/0374101 A1 | 12/2017 | Woolward |
| 2018/0005296 A1 | 1/2018 | Eades et al. |
| 2018/0083977 A1 | 3/2018 | Murugesan et al. |
| 2018/0095976 A1 | 4/2018 | Shelksohn |
| 2018/0191779 A1 | 7/2018 | Shieh et al. |
| 2018/0211019 A1* | 7/2018 | Baldwin ............... H04L 51/42 |
| 2018/0219888 A1* | 8/2018 | Apostolopoulos ........................... |
| | | G06F 16/9024 |
| 2018/0232262 A1 | 8/2018 | Chowdhury et al. |
| 2019/0043534 A1 | 2/2019 | Sievert |
| 2019/0052549 A1 | 2/2019 | Duggal et al. |
| 2019/0081963 A1 | 3/2019 | Waghorn |
| 2019/0141075 A1 | 5/2019 | Gay |
| 2019/0273746 A1 | 9/2019 | Coffing |
| 2019/0278760 A1 | 9/2019 | Smart |
| 2019/0317728 A1 | 10/2019 | Chen et al. |
| 2019/0342307 A1 | 11/2019 | Gamble et al. |

(56) References Cited

U.S. PATENT DOCUMENTS

| | | | |
|---|---|---|---|
| 2019/0394225 | A1 | 12/2019 | Vajipayajula et al. |
| 2020/0043008 | A1 | 2/2020 | Hrabik |
| 2020/0065343 | A1 | 2/2020 | Morkovine |
| 2020/0074078 | A1 | 3/2020 | Saxe et al. |
| 2020/0076826 | A1 | 3/2020 | Ford |
| 2020/0128047 | A1* | 4/2020 | Biswas ................ H04L 67/10 |
| 2020/0145441 | A1 | 5/2020 | Patterson et al. |
| 2020/0169565 | A1 | 5/2020 | Badawy et al. |
| 2020/0259852 | A1 | 8/2020 | Wolff |
| 2020/0382363 | A1 | 12/2020 | Woolward et al. |
| 2020/0382556 | A1 | 12/2020 | Woolward et al. |
| 2020/0382557 | A1 | 12/2020 | Woolward et al. |
| 2020/0382560 | A1 | 12/2020 | Woolward et al. |
| 2020/0382586 | A1 | 12/2020 | Badawy et al. |
| 2021/0112078 | A1* | 4/2021 | Huston, III ......... H04L 63/1425 |
| 2021/0120029 | A1 | 4/2021 | Ross et al. |
| 2021/0168150 | A1 | 6/2021 | Ross et al. |
| 2022/0121509 | A1* | 4/2022 | Jacob ................ G06F 11/0709 |
| 2022/0201024 | A1 | 6/2022 | Ross et al. |
| 2022/0201025 | A1 | 6/2022 | Ross et al. |
| 2022/0247774 | A1 | 8/2022 | Bigbee et al. |
| 2022/0311460 | A1 | 9/2022 | Azin et al. |

FOREIGN PATENT DOCUMENTS

| | | |
|---|---|---|
| TW | 201642618 A | 12/2016 |
| TW | 201703483 A | 1/2017 |
| TW | 201703485 A | 1/2017 |
| WO | WO2002098100 A1 | 12/2002 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | WO2017100365 A1 | 6/2017 |

OTHER PUBLICATIONS

"International Search Report" and "Written Opinion of the International Searching Authority," Patent Cooperation Treaty Application No. PCT/US2016/024300, May 3, 2016, 9 pages.

"International Search Report" and "Written Opinion of the International Searching Authority," Patent Cooperation Treaty Application No. PCT/US2016/024053, May 3, 2016, 12 pages.

"International Search Report" and "Written Opinion of the International Searching Authority," Patent Cooperation Treaty Application No. PCT/US2016/019643, May 6, 2016, 27 pages.

Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection, 3 pages.

"International Search Report" and "Written Opinion of the International Searching Authority," Patent Cooperation Treaty Application No. PCT/US2016/024310, Jun. 20, 2016, 9 pages.

"Feature Handbook: NetBrain® Enterprise Edition 6.1" NetBrain Technologies, Inc., Feb. 25, 2016, 48 pages.

Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.

"International Search Report" and "Written Opinion of the International Searching Authority," Patent Cooperation Treaty Application No. PCT/US2016/065451, Jan. 12, 2017, 20 pages.

Maniar, Neeta, "Centralized Tracking and Risk Analysis of 3rd Party Firewall Connections," SANS Institute InfoSec Reading Room, Mar. 11, 2005, 20 pages.

Hu, Hongxin et al., "Detecting and Resolving Firewall Policy Anomalies," IEEE Transactions on Dependable and Secure Computing, vol. 9, No. 3, May/Jun. 2012, pp. 318-331.

Woolward et al., "Template-Driven Intent-Based Security," U.S. Appl. No. 16/428,838, filed May 31, 2019, Specification, Claims, Abstract, and Drawings, 60 pages.

Woolward et al., "Validation of Cloud Security Policies," U.S. Appl. No. 16/428,849, filed May 31, 2019, Specification, Claims, Abstract, and Drawings, 54 pages.

Woolward et al., "Reliability Prediction for Cloud Security Policies," U.S. Appl. No. 16/428,858, filed May 31, 2019, Specification, Claims, Abstract, and Drawings, 59 pages.

Bates, Adam Macneil, "Designing and Leveraging Trustworthy Provenance-Aware Architectures", ProQuest Dissertations and Theses ProQuest Dissertations Publishing, 2017, 147 pages.

Wang et al., "System and Method for Attributing User Behavior from Multiple Technical Telemetry Sources," U.S. Appl. No. 17/162,761, filed Jan. 29, 2021; Specification, Claims, Abstract, and Drawings, 31 pages.

* cited by examiner

SYSTEM AND METHOD FOR ATTRIBUTING USER BEHAVIOR FROM MULTIPLE TECHNICAL TELEMETRY SOURCES

TECHNICAL FIELD

The present disclosure relates generally to data processing and, more particularly, to systems and methods for attributing user behavior from multiple technical telemetry sources.

BACKGROUND

Enterprises use computer networks for providing services, content, and offering products. The computer networks can connect both low-risk assets and critical enterprise assets. The low-risk assets can be vulnerable to hacker attacks, computer viruses, and malicious software that may lead to loss or leak of critical data. To get to the critical data attackers can target low-risk assets in order to enter the internal network. Inside the internal network and behind the hardware firewall, attackers can move across the internal network to gain access to critical enterprise assets.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for attributing user behavior from multiple technical telemetry sources. According to an example embodiment, a method for attributing user behavior from multiple technical telemetry sources may include determining that the user has logged into the computing device. The method may include, in response to the determination, collecting log data from a plurality of telemetry sources associated with the computing device. The method may include extracting, from the log data, activity data concerning activities of the computing device. The method may include analyzing the activity data to determine that the activity data are attributed to the user within a graph.

The plurality of the telemetry sources may include one of the following: logs of endpoint security applications (commonly known as Endpoint Protection Platforms or security agents, for example, Tanium™ or Crowdstrike™) installed on the computing device, flow logs from a router or a switch used for communications with the computer device, logs from a cloud-based network or access Application Programming Interfaces (APIs) (for example, Virtual Private Cloud (VPC) flow logs or CloudTrail Identity and Access Management (IAM) logs in Amazon Web Services (AWS™)), logs of operations of the computing devices, and logs of an identity management system.

Extracting the activity data may include determining a network address of the computing device, a list of active directories and files being accessed on the computing device, a list of applications being executed by the computing device, a list of network addresses of websites and other business applications associated with the computing device, types of connections to the websites and application servers (for example, an Amazon Simple Storage Service (S3) object store providing data storage services within AWS), an amount of data transferred between the computing device and the applications, and a type of operations conducted (for example, READ or WRITE operations against a file within an S3 object store).

The method may further include generating, based on the activity data, behavior attributes of the user and associating the behavior attributes with a unique identifier of the computing device. The unique identifier includes a media access control (MAC) address of the computing device.

Generating the behavior attributes may include creating a graph with nodes representing the applications and the websites and edges representing relationships between the user and the applications.

The method may include estimating security integrity of the computing device based on comparison of the behavior attributes to reference behavior attributes. The reference behavior attributes include further behavior attributes determined using log data of at least one further computing device associated with the user. The reference behavior attributes can be determined based on a plurality of further behavior attributes determined using further log data collected for a plurality of further computing devices associated with a plurality of further users having the same role within an enterprise.

The method may include, prior to the determining that the user has logged into the computer device, collecting further log data from the plurality of telemetry sources associated with the computing device. The method may include, prior to extracting the activity data, excluding the further log data from the log data in order to generate a baseline of the computer device without a user activity. The baseline may be used to determine a difference between a steady state of the computer device without the user activity and a state of the computer device with the user activity which represents the activity which can be attributed to the user.

According to another embodiment, a system for attributing user behavior from multiple technical telemetry sources is provided. The system may include at least one processor and a memory storing processor-executable codes, wherein the processor can be configured to implement the operations of the above-mentioned method for attributing user behavior from multiple technical telemetry sources.

According to yet another aspect of the disclosure, there is provided a non-transitory processor-readable medium, which stores processor-readable instructions. When the processor-readable instructions are executed by a processor, they cause the processor to implement the above-mentioned method for attributing user behavior from multiple technical telemetry sources.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides methods and systems for attributing user behavior from multiple technical telemetry sources. The proposed systems may provide a method for monitoring activities of a user when the user logged into a user device. The activities can be monitored based on network log data and application log data associated with the user device and the environment of the user device. The network log and data application log data can be obtained from different telemetry sources, such as routers, switches, and cloud-based applications and APIs. The activities may include typical applications used by the user, websites visited by the user, application servers accessed by the user, transaction performed by the user, and so forth.

Certain embodiments of the present disclosure may facilitate creation of behavioral baseline representing typical activities of the user. The behavioral baseline can be associated with a single user device or multiple user devices. Some embodiments may allow generating behavioral baseline of users associated with the same division or a department of an enterprise or of a common role of a group of users as defined within a corporate directory, an identity store, or the identity store. The behavioral baseline may be used to detect unusual and suspicious activities in a computer environment associated with the user device.

Figure 1:
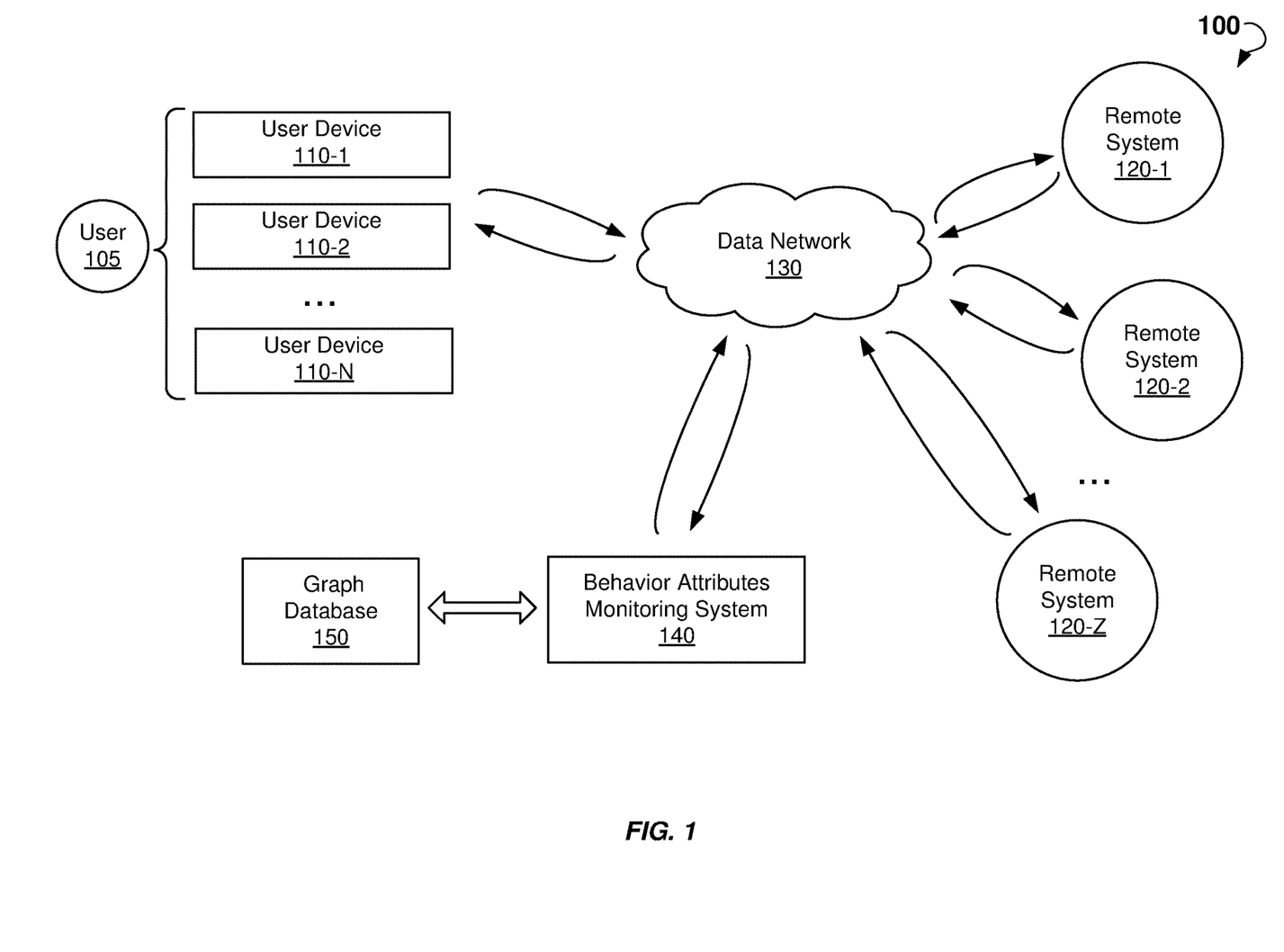
FIG. 1 is a block diagram of an environment, in which systems and methods for attributing user behavior from multiple technical telemetry sources can be implemented, according to some example embodiments.

Referring now to the drawings, FIG. 1 is a block diagram of an environment 100, in which systems and methods for attributing user behavior from multiple technical telemetry sources can be implemented, according to some example embodiments. The environment 100 may include user devices 110-$i$ (i=1, . . . , N) associated with user 105, remote (computer) systems 120-$i$ (i=1, . . . , Z), a data network 130, a behavior attributes monitoring system 140, and a graph database 150. As used herein, a user can be represented by an entity associated with user account credentials assigned to a human being, specific role, or software agent.

The user devices 110-$i$ (i=1, . . . , N) may include a notebook computer, a desktop computer, a tablet computer, a phablet, a smart phone, a personal digital assistant, a media player, a mobile telephone, a smart television set, in-vehicle infotainment, a smart home device, a mobile client device, an Internet-of-Things (IoT) device, and the like.

The remote systems 120-$i$ (i=1, . . . , N) can include application servers, database servers, client servers, data storage servers, which may communicate with each other and the user devices 110-$i$ (i=1, . . . , N) via the data network 130. The remote systems 120-$i$ (i=1, . . . , N) can be configured to provide websites, client applications, enterprise applications, enterprise database, file and object services, and so forth.

The data network 130 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network 130 can further include or interface with any one or more of a Recommended Standard 232 (RS-232) serial connection, an IEEE-1394 (FireWire™) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The behavior attributes monitoring system 140 can include an application executed on a standalone server or a closed-based computing resource. In some embodiments, the behavior attributes monitoring system 140 can be located on one of the remote systems 120-$i$ (i=1, . . . , Z).

Figure 2:
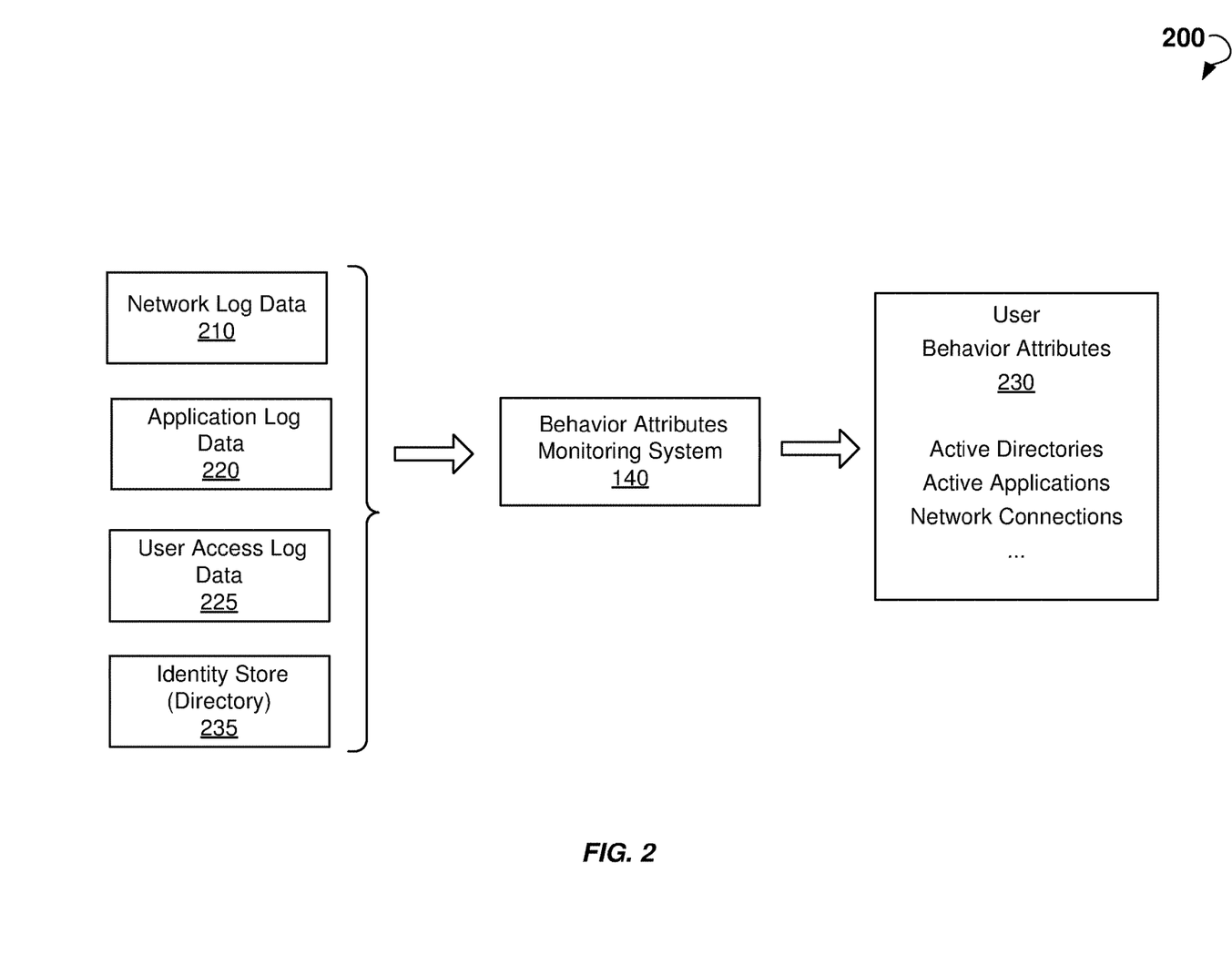
FIG. 2 is schematic showing functionalities of a behavior attributes monitoring system, according to an example embodiment.

FIG. 2 is schematic 200 showing functionalities of the behavior attributes monitoring system 140, according to some example embodiments. The behavior attributes monitoring system 140 can monitor network log data 210, application log data 220, and user access log data 225, and can be in contact with an identity store (directory) 235. The identity store 235 can store role memberships of users. The behavior attributes monitoring system 140 can extract behavior attributes 230 from the network log data 210, application log data 220, user access log data 225, and the identity store 235. The behavior attributes 230 may include activity data associated with the user devices 110-$i$ (i=1, . . . , N), such as active directories accessed by a user of the user devices, active applications used by the user, network connections of the user devices caused by activity of the user.

The network log data 210 can be recorded by switches or routers connected to the user devices 110-*i* (i=1, . . . , N). The network log data 210 can also be recorded by a cloud-based monitoring system (such as VPC Flow logs or CloudTrail within AWS). For example, the router or the cloud-based monitoring system can be configured to record logs of network data of connections of the user devices 110-*i* (i=1, . . . , N) to the remote systems 120-*i* (i=1, . . . , Z).

The application log data 220 may include logs of endpoint security applications (Endpoint Protection Platforms (EPPs), such as Tanium or CrowdStrike) installed on the user devices, logs of operations of the user devices (for example, generated by AuditD), and logs of an identity management system associated with the user devices 110-*i* (i=1, . . . , N).

Once the user 105 has logged into one of the user devices 110-*i* (i=1, . . . , N), the operational system of the user device generates a record of logs. The user 105 may open and close applications (for example, an Internet browser or client application) on the user devices. The user 105 may initiate, via the applications, connections to one of the remote systems 120-*i* (i=1, . . . , N). These activities of the user 105 (activity data) can be tracked using logs of the applications, logs of an endpoint security application, logs of an identity management system, and logs of the operational system of the user device. The activities of the user 105 can also be tracked using network logs from the router or the switch connected to the user device. Based on the determination that the user device is being utilized by the user 105, the behavior attributes monitoring system 140 can also track the relationship between the user 105 and the application, and can continue to do so over time as long as the user 105 is connected to the application via one or more user devices 110-*i* (i=1, . . . , N).

The activity data may include a network address of the user device, a list of active directories and files being accessed on the computing device, list of applications being executed by the computing device, list of network addresses of websites associated with the computing device, types of connections to the websites, and an amount of data transferred between the computing device and the websites or the applications.

In some embodiments, to distinguish between operations of the user device caused by the user and operations of computing device caused by the operational system and background agents running on the user devices, the behavior attributes monitoring system 140 can monitor network log data and application log data in prior to the user 105 has logged into the user device and after the user has logged off the user device. This facilitates generation of a user device baseline which can be subtracted (or otherwise accounted for) from the user behavior when the user is connected to determine the behavior that can be attributed to the user only.

The activity data determined based on network log data and application log data recorded when the user is not logged into the user device, can be attributed to user device itself. These activity data can be extracted from the activity data generated when the user is logged into the user device to obtain activity data that can be attributed to behavior of the user. The activity data attributed to the behavior of the user can be used to determine behavior attributes 230. The behavior attributes 230 can be associated with one of the user devices 110-*i* (i=1, . . . , N) or multiple user devices. The behavior attributes 230 may include active directories, active applications, network connections, amount of data transferred between user device and one of the remote systems, the time the user logged into the user device, the time the user logged out of the computing device, and so forth. In some embodiments, the behavior attributes 230 can be represented by a graph.

Figure 3:
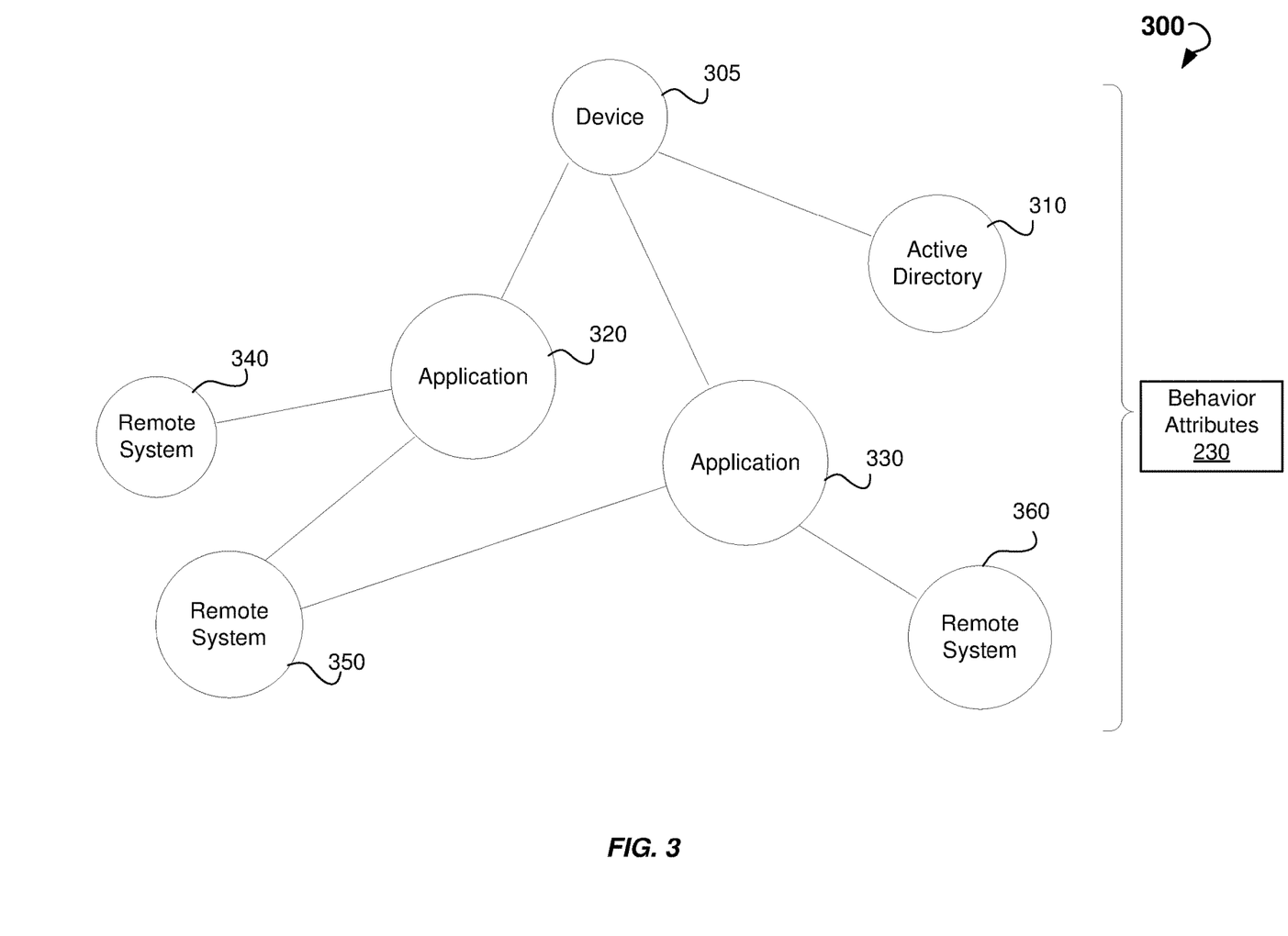
FIG. 3 shows an example subset of nodes and relationships in a graph representing behavior attributes, according to an example embodiment.

FIG. 3 shows an example graph 300 representing behavior attributes 230, according to an example embodiment. The example graph includes nodes 305, 310, 320, 330, 340, 350, and 360. The node 305 may represent the user device of the user 105. The node 305 can be associated with information concerning the user device, such as a type of the user device, operational system of the user device, network address of the user device, MAC address of the user device, and so forth.

The node 310 may represent an active directory accessed by the user 105. The node 310 can be associated with a path and name of the active directory. The nodes 320 and 330 may represent applications started on the user device when the user is logged into the user device. The nodes 320 and 330 can be associated with names of applications, version of the applications, directories used by the applications and so forth. The nodes 340, 350, and 360 can represent remote systems to which the applications are connected. The nodes 340, 350, and 360 can be associated with the name of server, network address of the server, website address, and the like. The graph 300 can represent typical actions (behavior) of the user 105 while the user 105 is logged into the user device 110-1. The graph 300 can be stored in graph database 150 (shown in FIG. 1).

The behavior attributes 230 can be associated with the user device 305 and can be further used for attributing the activity data of the user device 305 to the user 105. For example, when the user 105 is logged into the user device 305, the behavior attributes monitoring system 140 may generate, based on network log data 210 and application log data 220, a new graph representing new behavior attributes 230 during current login session. The new graph can be compared to previously recorded graphs associated with the user device to determine whether the new activity data can be attributed to the same user. The previous graphs can be stored in the graph database 150. The previous graphs can be identified based on MAC address of the user device.

If the user 105 is associated with a department or a role within an enterprise (represented by objects within an organizational unit structure, a role, or a group), then the behavior attributes (the graph) can be compared to reference behavior attributes that can be generated based on the behavior attributes of users associated with the department or the role within the enterprise.

Figure 4:
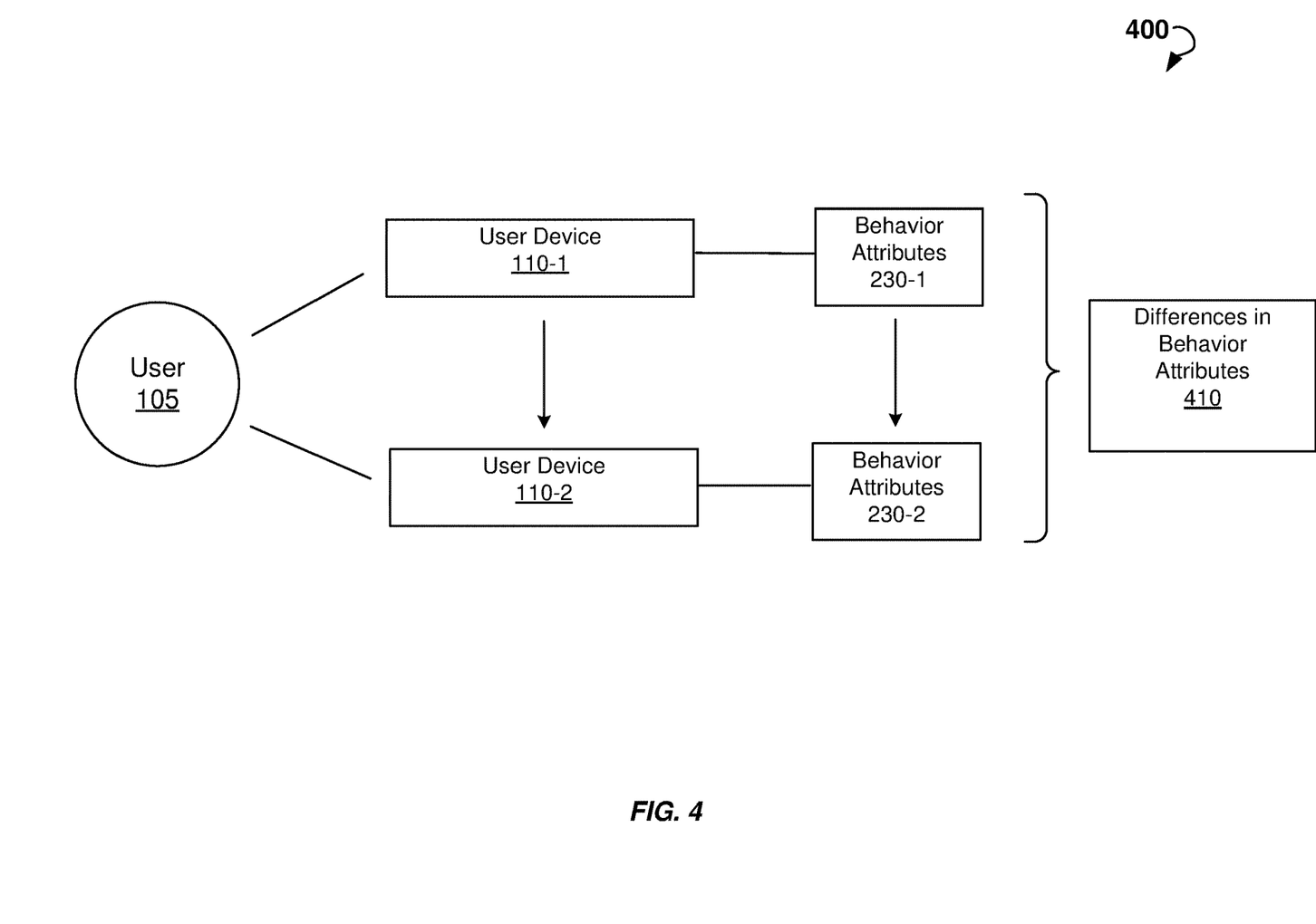
FIG. 4 is schematic showing differences in behavior attributes between user devices, according to an example embodiment.

FIG. 4 is schematic 400 showing differences of behavior attributes between user devices, according to an example embodiment. The user 105 can log into different user devices 110-1 and 110-2 to perform similar operations. For example, the user device 110-1 can include a notebook and the user device 110-2 can include a mobile client device, such as smartphone. The behavior attributes monitoring system 140 can determine behavior attributes 230-1 based on network log data and application log data associated with the user device 110-1. The behavior attributes monitoring system 140 can determine behavior attributes 230-2 based on network log data and application log data associated with the user device 110-2. The behavior attributes monitoring system 140 can determine differences 410 between the behavior attributes 230-1 and the behavior attributes 230-2. For example, the differences 410 can represent servers, websites, and applications accessed by the user 105 via both the user device 110-1 and the user device 110-2. The differences 410 can be used as reference behavior attributes of the user 105.

Figure 5:
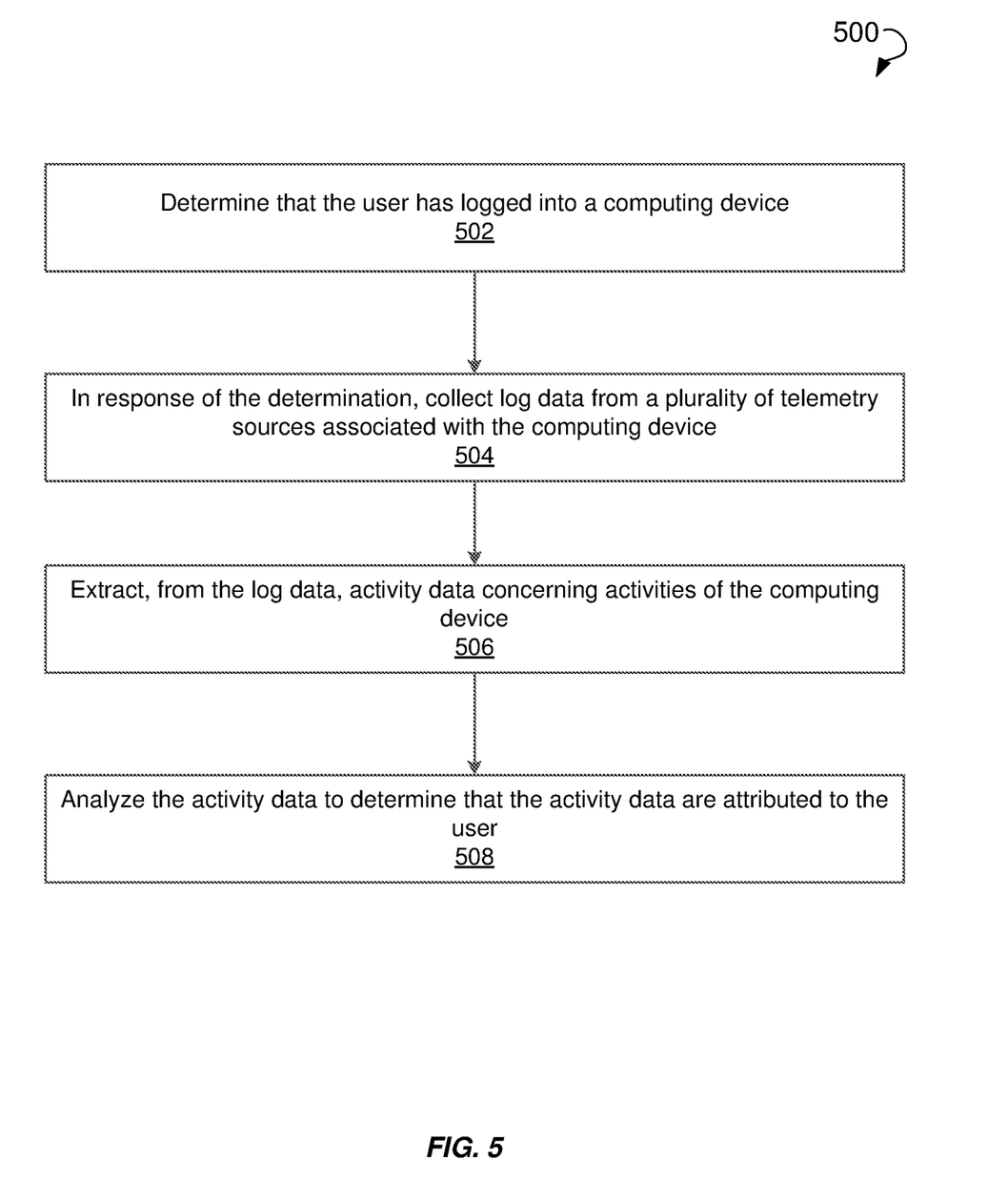
FIG. 5 is a flow chart showing a method for attributing user behavior from multiple technical telemetry sources, according to an example embodiment.

FIG. 5 is a flow chart of a method 500 for attributing user behavior from multiple technical telemetry sources, according to some example embodiments. The method 500 can be performed by the behavior attributes monitoring system 140 in environment 100 of FIG. 1.

The method 500 may commence in block 502 with determining that the user has logged into the computing device. In block 504, the method 500 may proceed, in response to the determination, with collecting log data from a plurality of telemetry sources associated with the computing device. The plurality of the telemetry sources may include one of the following: logs of endpoint security applications installed on the computing device, logs of a router providing a communications path to the computer device, logs of a cloud-based monitoring system configured to track network connections of the computer device, logs of operations of the computing devices, and logs of an identity management system.

In block 506, the method 500 may proceed with extracting, from the log data, activity data concerning activities of the computing device. Extracting the activity data can include determining a network address of the computing device, list of active directories and files being accessed on the computing device, list of applications being executed by the computing device, list of network addresses of websites associated with the computing device, types of connections to the websites, and amount of data transferred between the computing device and the websites or the applications.

In block 508, the method 500 may proceed with analyzing the activity data to determine that the activity data are attributed to the user. The method may then generate, based on the activity data, behavior attributes of the user and associate the behavior attributes with a unique identifier of the computing device. The unique identifier may include a media access control (MAC) address or a universally unique identifier (UUID) of the computing device.

The generation of the behavior attributes may include creating a graph. The graph may include nodes representing the applications and the websites and edges representing relationships between the user and the applications and/or the websites.

The method 500 may include estimating security integrity of the computing device based on comparison of the behavior attributes to reference behavior attributes. The reference behavior attributes may include further behavior attributes determined using log data of at least one further computing device associated with the user. Alternatively, the reference behavior attributes can be determined based on a plurality of further behavior attributes determined using further log data collected for a plurality of further computing devices associated with a plurality of further users having a same role within an enterprise.

The method 500 may include, prior to the determining that the user has logged into the computer device, collecting further log data from the plurality of telemetry sources associated with the computing device. The method 500 may include, prior to extracting the activity data, excluding the further log data from the log data.

Figure 6:
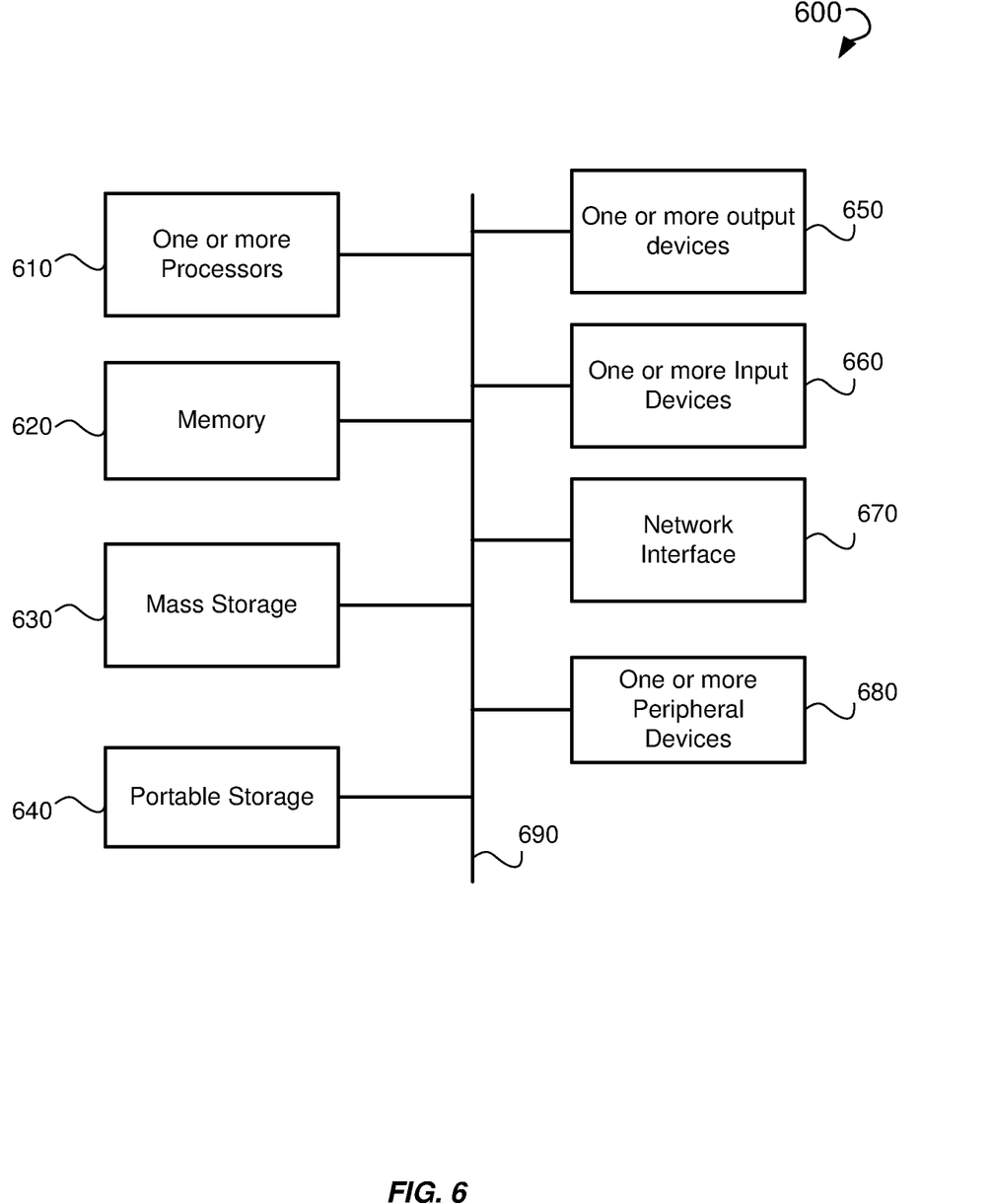
FIG. 6 shows a computing system that can be used to implement a system and a method for attributing user behavior from multiple technical telemetry sources, according to an example embodiment.

FIG. 6 illustrates an exemplary computing system 600 that can be used to implement embodiments described herein. The computing system 600 can be implemented in the contexts of the remote systems 120-*i* (i=1, . . . , Z), the behavior attributes monitoring system 140, the graph database 150, and the user devices 110-*i* (i=1, . . . , N). The exemplary computing system 600 of FIG. 6 may include one or more processors 610 and memory 620. Memory 620 may store, in part, instructions and data for execution by the one or more processors 610. Memory 620 can store the executable code when the exemplary computing system 600 is in operation. The exemplary computing system 600 of FIG. 6 may further include a mass storage 630, portable storage 640, one or more output devices 650, one or more input devices 660, a network interface 670, and one or more peripheral devices 680.

The components shown in FIG. 6 are depicted as being connected via a single bus 690. The components may be connected through one or more data transport means. The one or more processors 610 and memory 620 may be connected via a local microprocessor bus, and the mass storage 630, one or more peripheral devices 680, portable storage 640, and network interface 670 may be connected via one or more input/output buses.

Mass storage 630, which may be implemented with a magnetic disk drive or an optical disk drive, is a non-volatile storage device for storing data and instructions for use by a magnetic disk or an optical disk drive, which in turn may be used by one or more processors 610. Mass storage 630 can store the system software for implementing embodiments described herein for purposes of loading that software into memory 620.

Portable storage 640 may operate in conjunction with a portable non-volatile storage medium, such as a compact disk (CD) or digital video disc (DVD), to input and output data and code to and from the computing system 600 of FIG. 6. The system software for implementing embodiments described herein may be stored on such a portable medium and input to the computing system 600 via the portable storage 640.

One or more input devices 660 provide a portion of a user interface. The one or more input devices 660 may include an alphanumeric keypad, such as a keyboard, for inputting alphanumeric and other information, or a pointing device, such as a mouse, a trackball, a stylus, or cursor direction keys. Additionally, the computing system 600 as shown in FIG. 6 includes one or more output devices 650. Suitable one or more output devices 650 include speakers, printers, network interfaces, and monitors.

Network interface 670 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 670 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 680 may include any type of computer support device to add additional functionality to the computing system. The one or more peripheral devices 680 may include a modem or a router.

The components contained in the exemplary computing system 600 of FIG. 6 are those typically found in computing systems that may be suitable for use with embodiments described herein and are intended to represent a broad category of such computer components that are well known in the art. Thus, the exemplary computing system 600 of FIG. 6 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for attributing user behavior from multiple technical telemetry sources are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for attributing user behavior of a user of a first computing device, the system comprising:
   at least one processor; and
   a memory communicatively coupled to the at least one processor, the memory storing instructions executable by the at least one processor to perform a method comprising:

determining that the user has logged into the first computing device to initiate a start of a first log-in session;
   in response to the determination that the user has logged into the first computing device:
      collecting log data from a plurality of telemetry sources associated with the first computing device during the first log-in session;
      extracting, from the collected log data associated with the first computing device, activity data concerning activities of the first computing device;
      analyzing the activity data associated with the first computing device to determine that the activity data associated with the first computing device are attributed to the user; and
      determining that the user has logged into a second computing device to initiate a start of a second log-in session;
   in response to the determination that the user has logged into the second computing device:
      collecting log data from a plurality of telemetry sources associated with the second computing device during the second log-in session;
      extracting, from the collected log data associated with the second computing device, activity data concerning activities of the second computing device;
      determining a difference between the log data during the first log-in session and the log data during the second log-in session; and
      determining that the user has terminated the first and second log-in sessions;
   in response to the determination that the user has terminated the first and the second log-in sessions, terminating the collection of the log data from the plurality of telemetry sources associated with the first and the second computing device;
   prior to the determining that the user has logged into the first computing device, collecting further log data from the plurality of telemetry sources associated with the first computing device;
   prior to extracting the activity data concerning activities of the first computing device, excluding the further log data associated with the first computing device from the collected log data associated with the first computing device to generate of a baseline of the first computing device;
   accounting for the baseline of the first computing device for a security integrity of the first computing device;
   prior to the determining that the user has logged into the second computing device, collecting further log data from the plurality of telemetry sources associated with the second computing device;
   prior to extracting the activity data concerning activities of the second computing device, excluding the further log data associated with the second computing device from the log data associated with the second computing device to generate of a baseline of the second computing device; and
   accounting for the baseline of the second computing device for a security integrity of the second computing device.

2. The system of claim 1, wherein the plurality of the telemetry sources includes one or more of the following: logs of endpoint security applications installed on the first and the second computing device, logs of at least one of a router or a switch providing communications services to the first and the second computing device, logs from a cloud-based network, logs from access Application Programming Interfaces, logs from a monitoring system configured to track network connections of the first and the second computing device, logs of operations of the first and the second computing device, and logs of an identity management system.

3. The system of claim 1, wherein the extracting the activity data concerning activities of the first and the second computing device includes determining a network address of the first and the second computing device, a list of active directories and files being accessed on the first and the second computing device, a list of applications being executed by the first and the second computing device, a list of network addresses of websites associated with the first and the second computing device, types of connections to the websites, types of connections to the applications, an amount of data transferred between the first and the second computing device and the websites or the applications, and a type of operations conducted.

4. The system of claim 3, wherein the method further comprises:
generating, based on the activity data concerning activities of the first and the second computing device, behavior attributes of the user; and
associating the behavior attributes of the user with a unique identifier of the first and the second computing device being operated by the user during the first and the second log-in session.

5. The system of claim 4, wherein the unique identifier includes one of a media access control (MAC) address and a universally unique identifier (UUID) of the first and the second computing device.

6. The system of claim 4, wherein the generating the behavior attributes includes creating a graph, the graph including nodes representing the applications and the websites and edges representing relationships between the user and one or more of the applications and the websites.

7. The system of claim 4, wherein the method further comprises estimating the security integrity of the first and the second computing device based on a comparison of the behavior attributes to reference behavior attributes.

8. The system of claim 7, wherein the reference behavior attributes include further behavior attributes determined using log data of at least one further computing device associated with the user.

9. The system of claim 7, wherein the reference behavior attributes are determined based on a plurality of further behavior attributes determined using further log data collected for a plurality of further computing devices associated with a plurality of further users having a same role within an enterprise.

10. A method for attributing user behavior of a user of a first computing device, the method comprising:
determining that the user has logged into the first computing device to initiate a start of a first log-in session;
in response to the determination that the user has logged into the first computing device:
collecting log data from a plurality of telemetry sources associated with the first computing device;
extracting, from the log data associated with the first computing device, activity data concerning activities of the first computing device;
analyzing the activity data associated with the first computing device to determine that the activity data associated with the first computing device are attributed to the user; and
determining that the user has logged into a second computing device to initiate a start of a second log-in session;
in response to the determination that the user has logged into the second computing device:
collecting log data from a plurality of telemetry sources associated with the second computing device during the second log-in session;
extracting, from the collected log data associated with the second computing device, activity data concerning activities of the second computing device;
determining a difference between the log data during the first log-in session and the log data during the second log-in session; and
determining that the user has terminated the first log-in session;
in response to the determination that the user has terminated the first and the second log-in sessions terminating the collection of the log data from the plurality of telemetry sources associated with the first and second computing device;
prior to the determining that the user has logged into the first computing device, collecting further log data from the plurality of telemetry sources associated with the first computing device;
prior to extracting the activity data concerning activities of the first computing device, excluding the further log data associated with the first computing device from the log data associated with the first computing device to generate of a baseline of the first computing device;
accounting for the baseline of the first computing device for a security integrity of the first computing device;
prior to the determining that the user has logged into the second computing device, collecting further log data from the plurality of telemetry sources associated with the second computing device;
prior to extracting the activity data concerning activities of the second computing device, excluding the further log data associated with the second computing device from the log data associated with the second computing device to generate of a baseline of the second computing device; and
accounting for the baseline of the second computing device for a security integrity of the second computing device.

11. The method of claim 10, wherein the plurality of the telemetry sources includes one or more of the following: logs of endpoint security applications installed on the first and the second computing device, logs of at least one of a router or a switch providing communications services to the first and the second computing device, logs from a cloud-based network, logs from access Application Programming Interfaces, logs from a monitoring system configured to track network connections of the first and the second computing device, logs of operations of the first and the second computing device, and logs of an identity management system.

12. The method of claim 10, wherein the extracting the activity data concerning activities of the first and the second computing device includes determining a network address of the first and the second computing device, a list of active directories and files being accessed on the first and the second computing device, a list of applications being executed by the first and the second computing device, a list of network addresses of websites associated with the first and the second computing device, types of connections to the websites, types of connections to the applications, an amount of data transferred between the first and the second computing device and the websites or the applications, and a type of operations conducted.

13. The method of claim 12, further comprising:
generating, based on the activity data concerning activities of the first and the second computing device, behavior attributes of the user; and
associating the behavior attributes of the user with a unique identifier of the first and the second computing device being operated by the user during the first and the second log-in session.

14. The method of claim 13, wherein the unique identifier includes one of a media access control (MAC) address and a universally unique identifier (UUID) of the first and the second computing device.

15. The method of claim 13, wherein the generating the behavior attributes includes creating a graph, the graph including nodes representing the applications and the websites and edges representing relationships between the user and one or more of the applications and the websites.

16. The method of claim 13, further comprising estimating the security integrity of the first and the second computing device based on a comparison of the behavior attributes to reference behavior attributes.

17. The method of claim 16, wherein the reference behavior attributes include further behavior attributes determined using log data of at least one further computing device associated with the user.

18. The method of claim 16, wherein the reference behavior attributes are determined based on a plurality of further behavior attributes determined using further log data collected for a plurality of further computing devices associated with a plurality of further users having a same role within an enterprise.

19. A non-transitory processor-readable medium having embodied thereon a program being executable by at least one processor to perform a method for attributing user behavior of a user of a first computing device, the method comprising:
determining that the user has logged into the first computing device to initiate a start of a first log-in session;
in response to the determination that the user has logged into the first computing device:
collecting log data from a plurality of telemetry sources associated with the first computing device during first log-in session;
extracting, from the collected log data associated with the first computing device, activity data concerning activities of the first computing device;
analyzing the activity data associated with the first computing device to determine that the activity data associated with the first computing device are attributed to the user; and
determining that the user has logged into a second computing device to initiate a start of a second log-in session;
in response to the determination that the user has logged into the second computing device:
collecting log data from a plurality of telemetry sources associated with the second computing device during the second log-in session;
extracting, from the collected log data associated with the second computing device, activity data concerning activities of the second computing device;
determining a difference between the log data during the first log-in session and the log data during the second log-in session;
determining that the user has terminated the second log-in session;
in response to the determination that the user has terminated the first and the second log-in sessions, terminating the collection of the log data from the plurality of telemetry sources associated with the first and the second computing device;
prior to the determining that the user has logged into the first computing device, collecting further log data from the plurality of telemetry sources associated with the first computing device;
prior to extracting the activity data concerning activities of the first computing device, excluding the further log data associated with the first computing device from the log data associated with the first computing device to generate of a baseline of the first computing device;
accounting for the baseline of the first computing device for a security integrity of the first computing device;
prior to the determining that the user has logged into the second computing device, collecting further log data from the plurality of telemetry sources associated with the second computing device;
prior to extracting the activity data concerning activities of the second computing device, excluding the further log data associated with the second computing device from the log data associated with the second computing device to generate of a baseline of the second computing device; and
accounting for the baseline of the second computing device for a security integrity of the second computing device.

* * * * *